United States Patent [19]

Johnson

[11] 3,883,894

[45] May 13, 1975

[54] DISK DRIVE SERVO SYSTEM

[75] Inventor: Terry G. Johnson, San Jose, Calif.

[73] Assignee: Storage Disk Corporation, Louisville, Colo.

[22] Filed: Oct. 19, 1973

[21] Appl. No.: 407,884

[52] U.S. Cl. .................... 360/78; 324/177; 360/77; 360/98; 360/106

[51] Int. Cl. ....................... G11b 21/08; G11b 19/14

[58] Field of Search ........... 360/78, 69, 73, 106, 77, 360/71, 72, 70, 75, 86, 98; 324/69, 177, 70; 317/5, 6; 318/393-398, 647, 653

[56] References Cited

UNITED STATES PATENTS

| | | | |
|---|---|---|---|
| 2,733,425 | 1/1956 | Willams et al. | 360/78 |
| 2,811,709 | 10/1957 | Haselton et al. | 360/78 |
| 3,156,906 | 11/1964 | Cummins | 360/78 |
| 3,158,844 | 11/1964 | Bowdle | 360/78 |
| 3,568,059 | 3/1971 | Sordello | 324/177 |

*Primary Examiner*—Alfred H. Eddleman
*Attorney, Agent, or Firm*—Woodcock, Washburn, Kurtz & Mackiewicz

[57] ABSTRACT

In an electronic tachometer for a magnetic disk subsystem an oscillating position signal representing position of the access mechanism with respect to the tracks is differentiated to produce a velocity signal representing velocity of the access mechanisms except during those intervals of discontinuity when the position signal undergoes a reversal in amplitude change. A signal representing the access mechanism motor current is integrated and combined with the differentiated position signal to produce an output signal representing access mechanism velocity. The integrated motor current signal is applied to a variable gain circuit which has a different gain during the accelerate and decelerate modes.

4 Claims, 12 Drawing Figures

DISK DRIVE SERVO SYSTEM

BACKGROUND OF THE INVENTION

This invention relates to magnetic disk subsystems and more particularly to an electronic tachometer producing an output signal representing access mechanism velocity with respect to the tracks of the magnetic disks.

State of the art magnetic disk subsystems include the IBM 3330 system. Such a system includes a pack of magnetic disks which is removable from the mechanism. One disk in the pack has recorded thereon a servo track. The signal produced by a head from this track represents the position of the access mechanism with respect to the tracks of the disks in the pack. In magnetic disk subsystems it is necessary to produce a velocity signal representing the velocity of the access mechanism at it moves across the tracks in a seek. The velocity signal is necessary to control the servo system which positions the access mechanism to a new track. In the IBM 3330 system the position signal is not differentiated to produce a velocity signal. Rather, a separate magnetic plunger type of transducer is used to produce a velocity signal. One reason that the position signal from the servo track is not used to produce the velocity signal is that this machine requires that a velocity signal be produced during the time that a pack is being removed from the machine. In this operation the heads are brought to a rest position out of contact with the magnetic disk surface. During this time the head normally on the servo track is not producing a position signal but it is nevertheless important to have a velocity signal during such an "unload" operation.

The copending application of Ivan Pejcha, Ser. No. 364,950, filed May 29, 1973 describes a magnetic tape subsystems in which the disk pack is normally nonremovable from the machine. In a machine such as this, it is possible to use the position signal from the servo track to generate the velocity signal. As will be subsequently discussed, there are difficult problems in generating a usable velocity signal from the position signal and this invention is in a system which successfully uses the position signal from the servo track to generate a velocity signal.

One approach to generating a velocity signal from a position signal is shown in U.S. Pat. No. 3,568,059 Sordello.

SUMMARY OF THE INVENTION

The position signal generated from the servo track of a disk is combined with the access mechanism motor current signal to produce an output representing the velocity of the access mechanism across the disk tracks. The position signal is applied to a differentiator which produces a signal representing velocity except during those intervals when the oscillating position signal undergoes a reversal in amplitude change. During these intervals, the integral of the motor current is used to produce the output signal representing mechanism velocity.

In accordance with this invention, the integrated motor current signal is combined with the differentiated position signal in such a manner that the differentiated position signal always controls the output velocity signal. One of the problems in using the integrated current signal is that an integral signal drifts with time. Further, the motor force constant varies from one track position to another and it varies from machine to machine. Hence the integral of the motor current is not a good indication of velocity by itself. In accordance with this invention the integrated motor current is applied through a variable gain network which combines it with the differentiated position signal in such a manner that the differentiated position signal always controls the velocity signal.

It is an object of this invention to produce a velocity signal in a magnetic disk system from the presently available servo track of the disk system without the expense of an added transducer for the velocity signal.

It is another object of this invention to produce an accurate, reliable, velocity signal representing the velocity of the access mechanism across the magnetic disk tracks.

The foregoing and other objects, features and advantages of the invention will be better understood from the following more detailed description and appended claims.

DESCRIPTION OF A PREFERRED EMBODIMENT

Figure 1:
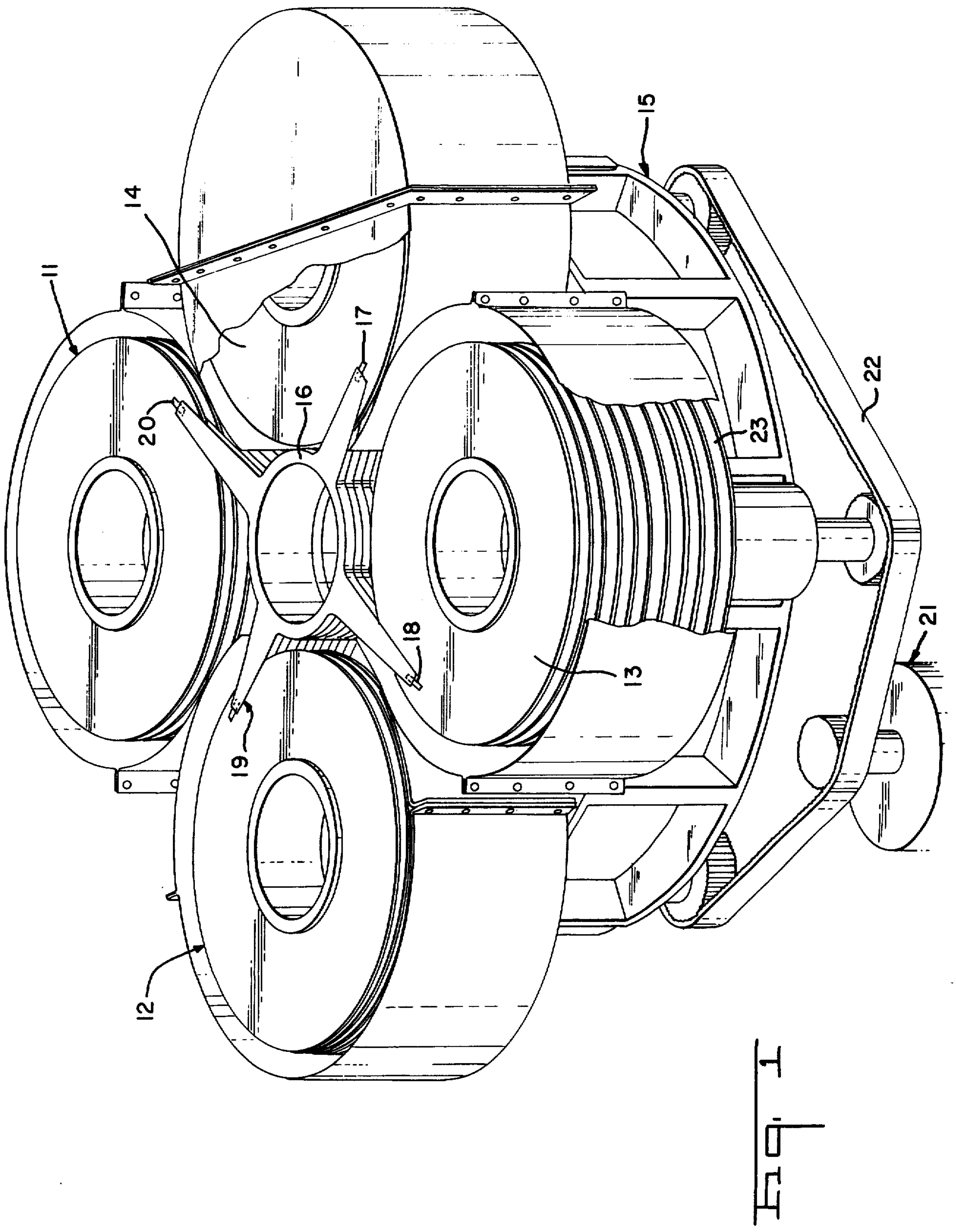
FIG. 1 depicts a nonremovable disk pack subsystem having a servo track on the lower disk.

FIG. 1 shows a magnetic disk subsystem of the type to which the electronic tachometer of this invention is particularly applicable. Four packs of magnetic disks 11–14 are mounted with their spindles parallel to one another on the base plate 15. A rotary access mechanism including positioning rotor 16 concurrently rotates magnetic heads, including heads 17–20 into read/write relationship with the corresponding tracks on disks on all four packs 11–14. The disks of all four packs are concurrently rotated by a motor 21 which acts through the timing belt 22 to rotate the spindle in each pack. Positioning rotor 16 has a motor (not shown) which rotates arms carrying the magnetic heads into read/write relationship with a particular disk track in each of the packs. A signal representing the track position of the access mechanism is generated by the servo track which is recorded on the lower disk 23 in one pack.

Figure 2:
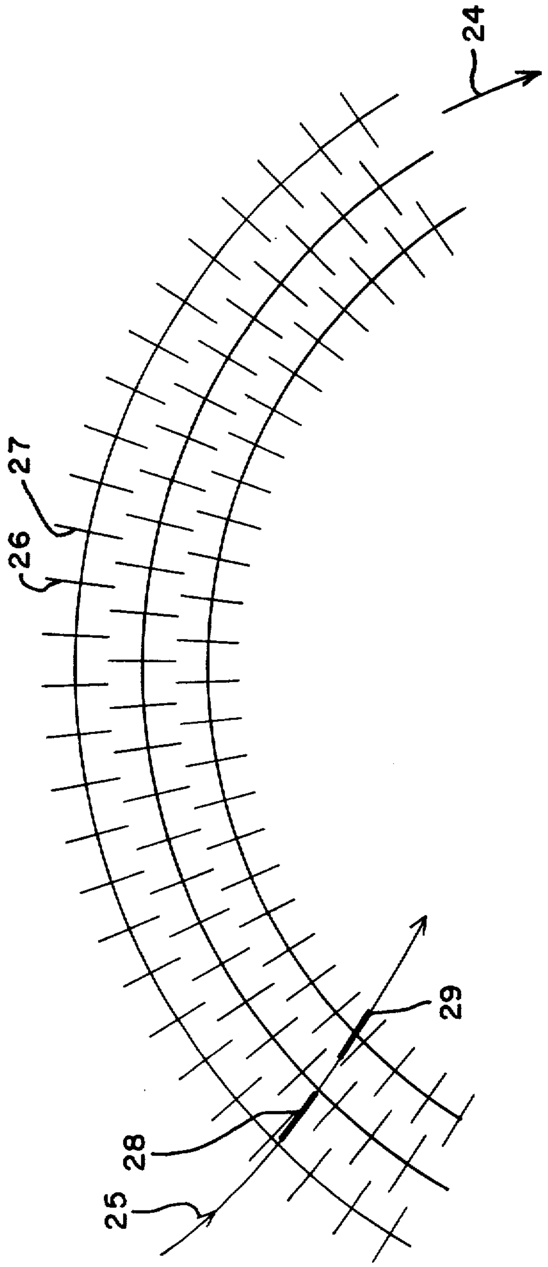
FIG. 2 depicts the servo tracks.
Figures 2A, 2B:
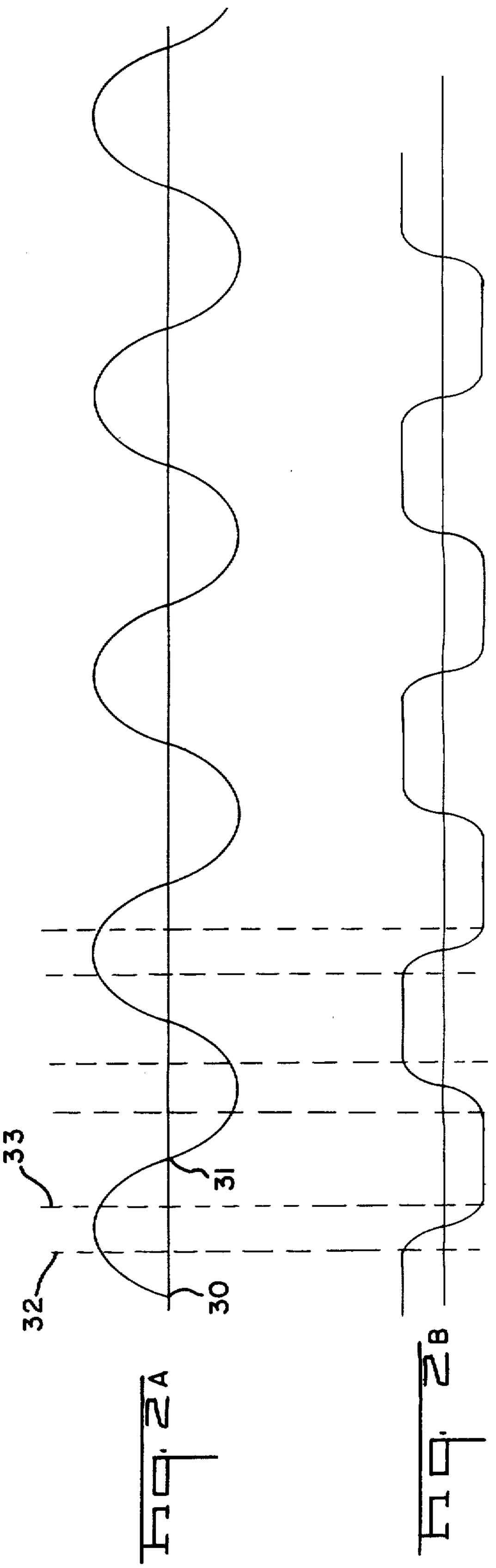
FIGS. 2A and 2B are waveforms showing the position signal and its differential during a period of constant velocity.

FIG. 2 depicts a portion of the recording on the servo disk. In FIG. 2 the arrow 24 depicts the direction of rotation of the disk and the arrow 25 depicts the movement of a playback head across the servo tracks. Magnetic marks such as those indicated at 26 and at 27 are recorded in tracks. When the magnetic head is in the position indicated at 28, the generated signal is a null. When the head is in the position indicated at 29, the generated signal is a maximum. As the head moves across the tracks at a constant velocity, a sine waveform of the type shown in FIG. 2A is generated. The null points at 30 and 31 identify the times at which the heads are aligned with a disk track. This oscillating position signal is used to position the access mechanism to a particular track during a seek. In accordance with the present invention this oscillating position signal is also used in the generation of a signal representing access mechanism velocity.

Figure 3:
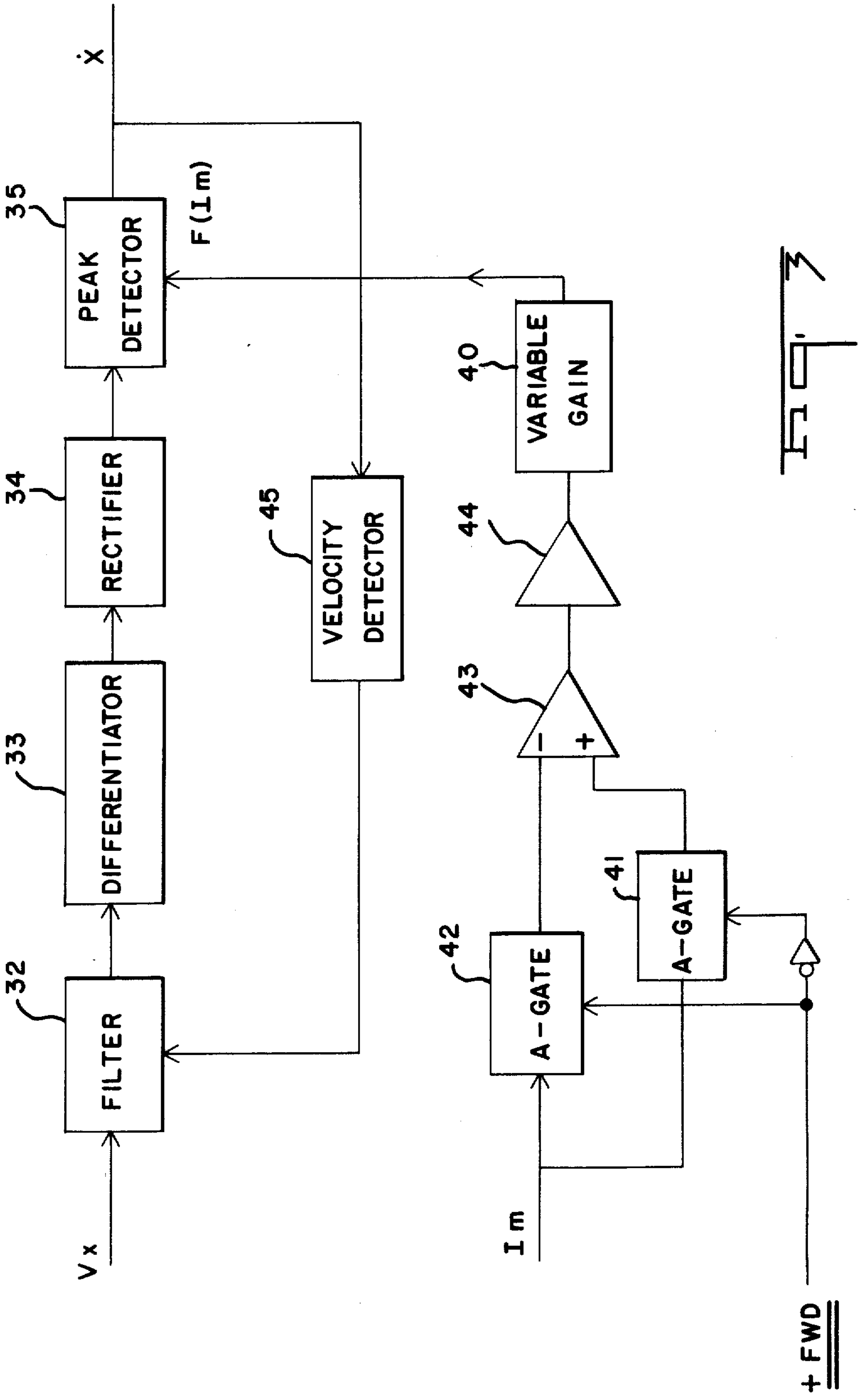
FIG. 3 is a block diagram of the electronic tachometer.

FIG. 3 is a block diagram of the electronic tachometer of this invention. The oscillating position signal $V_x$ is applied to the filter 32. The oscillating signal is differentiated in differentiator 33 which produces a velocity signal representing the velocity of the access mechanism across the tracks of the magnetic disks. The waveform of the differential signal is depicted in FIG. 2B. The differentiated signal is a good indication of velocity except during those intervals when the position signal is undergoing a reversal in the direction of change of the amplitude. For example, between the dotted lines 30*a* and 31*a* the oscillating position signal is reversing from an increasing change in amplitude to a decreasing change in amplitude. During this interval the differentiated signal, FIG. 2B, is indeterminate and does not provide a reliable indication of velocity. The differentiated signal is rectified in the rectifier 34 which produces an output representing the absolute value of the differentiated signal. The absolute signal is applied to peak detector 35 which produces an output representing the velocity of the access mechanism across the tracks.

Figures 4A, 4B:
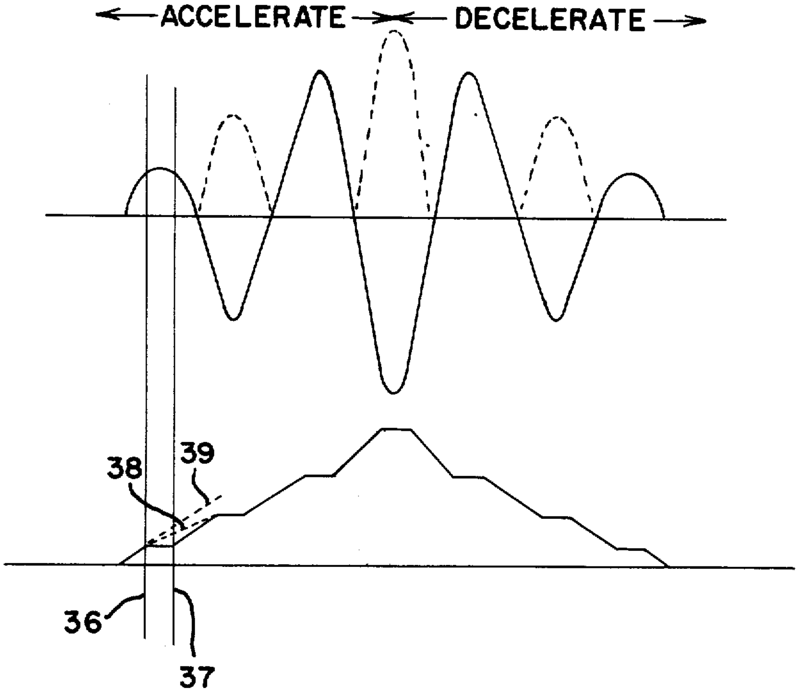
FIGS. 4A–4E are waveforms depicting the operation of the invention.

It can be appreciated that during periods of constant velocity, such as depicted in FIGS. 2A and 2B, that the peak value of the differentiated, full wave rectified, position signal would be a reliable indication of velocity. However, periods of constant velocity are not the primary concern. Rather, each seek will ordinarily initially have an acceleration portion and then a deceleration portion in which the motor current is reversed. The output of rectifier 34 during a typical seek is depicted in FIG. 4A. (For convenience, the full wave rectified waveform is shown by reversing the negative half waves as indicated by the dashed lines.) The peak detected absolute value of the differentiated position signal is shown in FIG. 4B. Note that in the intervals, such as between 36 and 37, where the position signal is undergoing a reversal of amplitude change, the peak detector holds the last peak of the rectified differentiated output. In accordance with this invention, in this and other similar intervals the signal is supplemented by the integral of the motor current. This supplemental signal is indicated by the dashed line 38. In accordance with an important aspect of this invention the supplemental signal is intentionally low during an accelerate mode. Note that if the supplemental signal supplied by the integral of motor current were slightly high, as might be indicated by the dashed line 39, then the motor current signal would gain control and would determine the waveform of the output velocity signal. This is not desired. Rather, it is desired that the differentiated position signal primarily determine the waveform of the output velocity signal. By keeping the supplemental signal slightly lower that it should be, this is accomplished.

During the decelerate mode the supplemental integrated motor current signal subtracts voltage from the peak detector 35. In this case the supplemental signal should be slightly higher than normal. This drives the peak detected voltage below what it should be and allows the differentiated position signal to bring it up to the proper level. In this way, the differentiated position signal always maintains control of the output velocity signal.

This is accomplished by the variable gain circuit 40 of FIG. 3. During an accelerate mode the variable gain circuit has a gain of 0.9, as an example. During the decelerate mode the variable gain circuit 40 has a gain of 1.1. In this way, the integrated motor current signal is always applied as a supplement which allows the differentiated position signal to maintain control of the output.

Figure 4C:
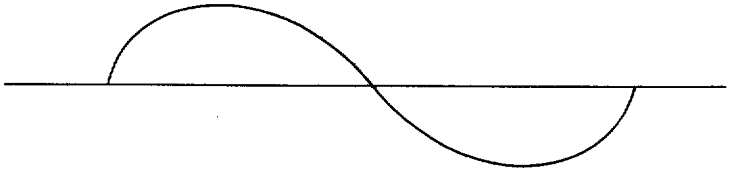
Figure 4D:
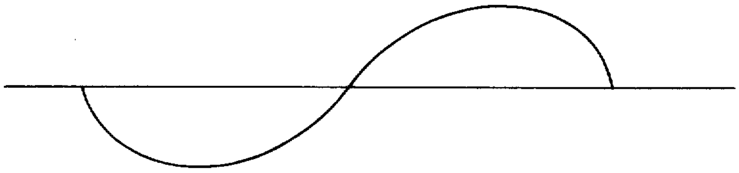
Figure 4E:
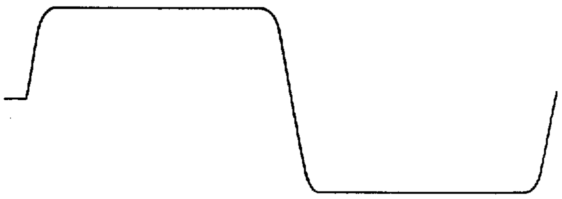

A signal representing motor current is applied to the analog gates 41 and 42. During a forward seek the motor current is opposite to that applied during a reverse seek. FIG. 4C depicts motor current during a forward seek and FIG. 4D depicts motor current during a reverse seek. Analog gate 41 is enabled during a forward seek to apply the motor current signal to the non-inverting input of amplifier 43. Analog gate 42 is enabled during a reverse seek to apply the motor current signal to the inverting input of amplifier 43. The output of amplifier 43, shown in FIG. 4E, is a signal which is always positive during the accelerate portion of a seek and negative during the decelerate portion of a seek. This is applied through amplifier 44 and variable gain circuit 40 to the capacitor in the peak detector 35. This capacitor integrates the motor current signal during those intervals when there is a reversal in the amplitude change of the velocity signal.

The invention includes a further feature. A velocity detector circuit 45 changes the bandwidth of the filter 32 in accordance with different tape speeds. In a particular embodiment, four bandwidths are provided for the filter 32. In a disk drive of the type under consideration the velocity of the access mechanism varies from approximately 0.4 inches per second to approximately 80 inches per second. This is a 200 to 1 range of velocities. A very broad bandwidth is required for the 80 inches per second signal but a very narrow bandwidth is required for the 0.4 inches per second signal in order to provide the best noise discrimination. In the example under consideration four different bandwidths are provided for the following four velocity ranges: 0.4 through 1½ inches per second; 1.5 through 5.6 inches per second; 5.6 through 21 inches per second; and 21 through 80 inches per second.

Figure 5A:
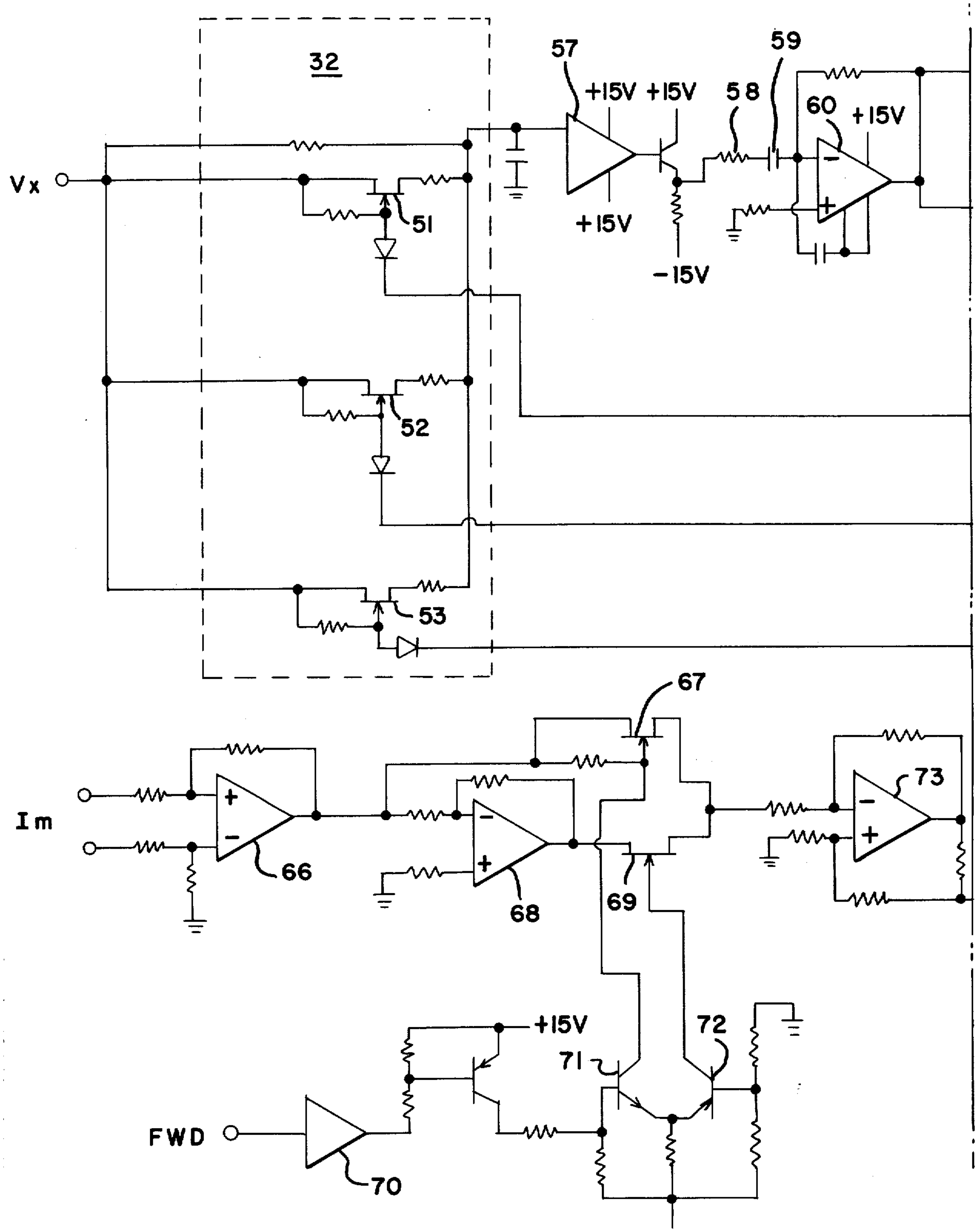
FIGS. 5A and 5B together show a circuit diagram of the electronic tachometer.
Figure 5B:
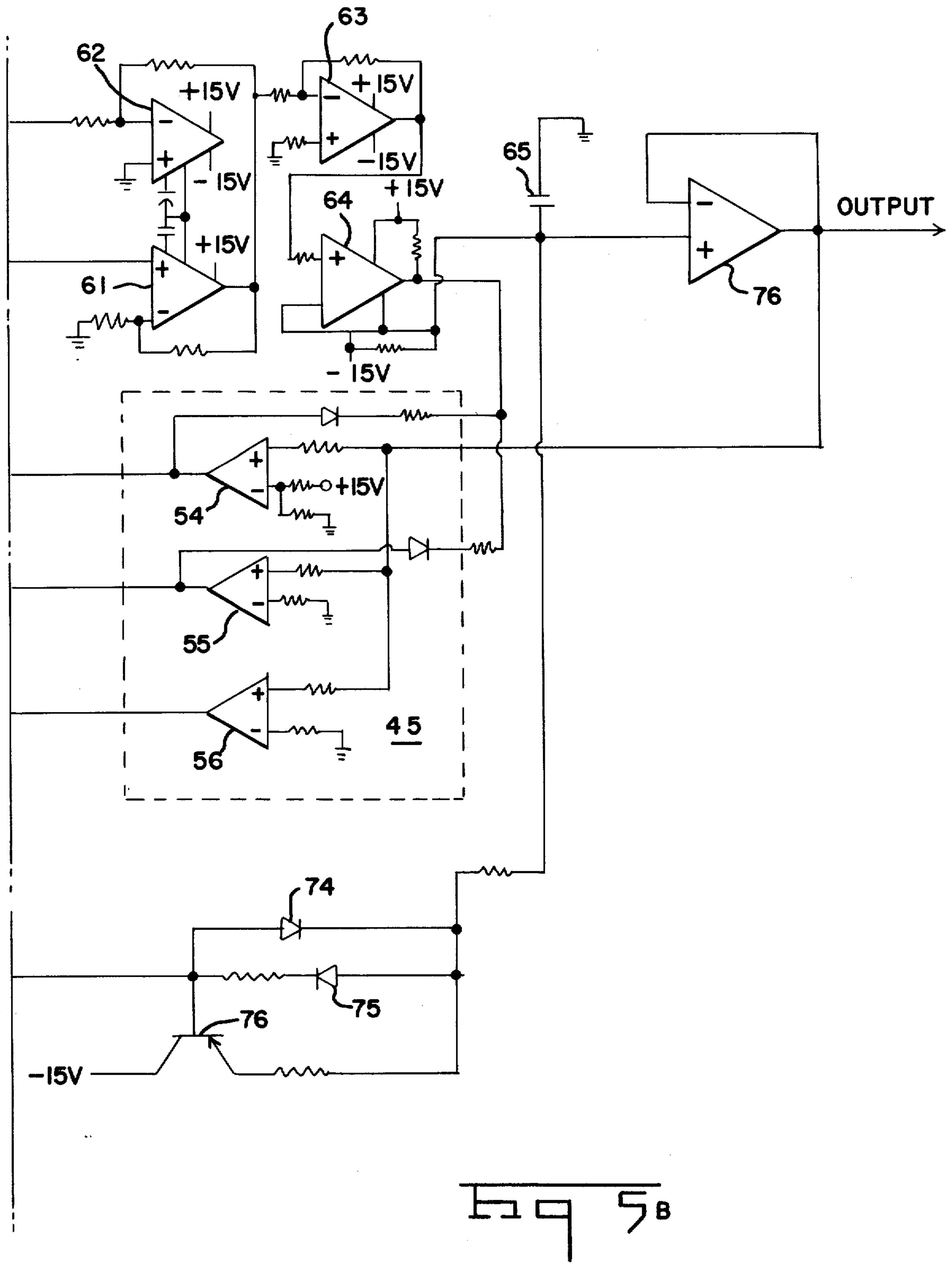

Referring now to FIGS. 5*a* and 5*b*, the position signal is applied to filter 32 which includes the transistors 51, 52 and 53. From 0.4 to 1.5 inch per second none of these transistors are turned on. The transistor 51 is turned on when the velocity between 1.5 and 5.63 inches per second is detected. The transistor 52 is turned on when a velocity between 5.63 and 21.1 inches per second is detected and the transistor 53 is turned on when a velocity between 21.1 and 80 inches per second is detected. These transistors are turned on by comparator amplifiers 54, 55 and 56 in the velocity detector 45.

The filtered position signal is applied through a buffer amplifier 57 to the differentiator which includes the resistor 58 and capacitor 59. Another buffer amplifier 60 applies the signal to the absolute value or rectification circuit which includes amplifiers 61 and 62. Another buffer amplifier 63 applies the signal to the peak detector which includes amplifier 64. This circuit will always charge the capacitor 65 to the peak of the differentiated position signal except during those intervals when the position signal is undergoing a reversal in the change in amplitude. During these intervals the capacitor 65 integrates currrent representing the magnitude of the motor current. A signal representing motor current is applied through buffer amplifier 66 and is inverted by amplifier 68 and applied to the analog gate including transistor 69. Transistor 67 is rendered conductive during a forward seek and transistor 69 is conductive during a reverse seek. This is controlled by the FWD signal which is applied through amplifier 70 to the complementary transistors 71 and 72. The FWD signal is present only during a forward seek.

The amplifier 73 supplies charging current to the capacitor 65. During an accelerate mode the charging current passes through the diode 74 to the capacitor 65. During a deceleration mode current flows from the capacitor 65, through the diode 75 and through the transistor 76 which is turned on during deceleration.

In this manner, there is applied to the capacitor 65 a voltage representing the absolute value of the differentiated position signal except during intervals when the position signal is indeterminate. During those intervals, the capacitor integrates current representing the motor current through the motor driving the access mechanism. The voltage on capacitor 65 is applied through an output amplifier 76 which produces an output voltage accurately representing the velocity of the access mechanism across the tracks of the magnetic disk.

While a particular embodiment of the invention has been shown and described, various modifications are within the true spirit and scope of the invention.

What is claimed is:

1. An electronic tachometer for a magnetic disk subsystem of the type including:

magnetic disks which are mounted for common rotation;

an access mechanism carrying magnetic heads into read-write relationship with the tracks of said magnetic disks;

a motor for driving said access mechanism;

a servo disk mounted for concurrent rotation with said other disks, said servo disk having recorded thereon a magnetic pattern which produces from a head in reading relationship therewith an oscillating position signal representing the position of said access mechanism with respect to the tracks of said disks during a seek for a particular track;

a variable bandwidth filter for receiving and filtering said position signal;

differentiating means coupled to said variable bandwidth filter to receive a filtered signal therefrom and to produce a velocity signal which represents the velocity of said access mechanism across the tracks of said magnetic disks except during those intervals when said oscillating position signal undergoes a reversal in amplitude change;

means for generating a current signal representing the current supplied to said motor driving said access mechanism;

integrating means for integrating said motor current signal;

combining means for combining the differentiated position signal and the integrated current signal to produce an output signal representing access mechanism velocity with respect to said tracks;

a velocity detector coupled to said combining means for producing an output signal representing the velocity being applied to said velocity detector, the output of said velocity detector being applied to said variable bandwidth filter to change the bandwidth of said filter so that said filter has a broad bandwidth for high velocity signals and a lower band width for low velocity signals;

said motor current signal having a polarity in the reverse direction which is the opposite of its polarity when said rotary access mechanism is being driven in the forward direction, said integrated motor current signal being applied to add to the voltage on said combining means during the acceleration portion of a seek and being applied to subtract from said voltage during a deceleration portion of a seek; and a variable gain circuit, said motor current signal being applied through said variable gain circuit to said combining means, said variable gain circit including means for switching the gain of said motor current signal between a gain less than one and a gain greater than one during the accelerate and decelerate portions of each seek.

2. The tachometer recited in claim 1 wherein said means for combining comprises:

a capacitor, a peak detector, said differentiated position signal being applied to said peak detector, said peak detector applying only the portion of the differentiated position signal between said intervals to said capacitor, the output of said integrator being applied to said capacitor so that the integrated motor current signal controls the charge on said capacitor during said intervals.

3. The tachometer recited in claim 1 further comprising:

an absolute value circuit connected between said differentiator and said peak detector.

4. The tachometer recited in claim 2 further comprising first and second analog gates controlled by the forward and reverse modes of operation of said motor, said motor current signal being applied to said gates, one of said analog gates producing an inverted motor current signal the other producing a noninverted current signal, said analog gates being controlled so that the sum of the output of the gate is always a signal of one polarity during an accelerate portion of each seek and a signal of the opposite polarity during the deceleration portion of each seek.

* * * * *